United States Patent [19]
Kato et al.

[11] Patent Number: 6,059,068
[45] Date of Patent: May 9, 2000

[54] STEERING APPARATUS FOR A VEHICLE

[75] Inventors: Takayuki Kato; Mitsuhiko Nishimoto, both of Kashihara, Japan

[73] Assignee: Koyo Seiko Co., Ltd., Osaka, Japan

[21] Appl. No.: 08/992,991

[22] Filed: Dec. 18, 1997

[30] Foreign Application Priority Data

Jan. 21, 1997 [JP] Japan ................................ 9-008971

[51] Int. Cl.$^7$ ............................................ B62D 5/04
[52] U.S. Cl. ........................... 180/402; 180/446; 701/43
[58] Field of Search .................................. 180/446, 402, 180/403, 443; 701/43, 42, 41; 280/773

[56] References Cited

U.S. PATENT DOCUMENTS

| | | | |
|---|---|---|---|
| 3,580,352 | 5/1971 | Hestad et al. ........................... | 180/402 |
| 4,984,646 | 1/1991 | Sano et al. ............................... | 180/402 |
| 5,236,335 | 8/1993 | Takeuchi et al. ........................ | 180/446 |
| 5,251,135 | 10/1993 | Serizawa et al. ........................ | 180/402 |
| 5,299,648 | 4/1994 | Watanabe et al. ....................... | 180/446 |

FOREIGN PATENT DOCUMENTS 42 32 256  4/1993  Germany .

*Primary Examiner*—Anne Marie Boehler
*Attorney, Agent, or Firm*—Darby & Darby

[57] ABSTRACT

A steering apparatus for a vehicle comprising a reaction force control means for controlling an increase and decrease in a reaction force to be applied to a steering operating means on the basis of a reaction force instruction signal, a motor for applying the reaction force to a steering operating means with control of the reaction force control means, means for detecting an overload state of the motor, means for notifying a reaction force instruction means of the overload state when the overload state is detected, and a reaction force instruction means for decreasing to correct the reaction force instruction signal in a predetermined ratio when receiving the notification of the overload state from the reaction force control means.

8 Claims, 5 Drawing Sheets

STEERING APPARATUS FOR A VEHICLE

FIELD OF THE INVENTION

The present invention relates to a steering apparatus for a vehicle which directs a vehicle according to an operation by a driver.

BACKGROUND OF THE INVENTION

A vehicle is steered by transmitting an operation of a steering operating means provided in a vehicle chamber such as rotation of a steering wheel to a steering mechanism provided outside of the vehicle chamber so that wheels (in general, front wheels) for steering are directed.

In recent years, a power steering apparatus wherein an actuator for helping steering including a hydraulic cylinder, an electric motor and so on are provided in a midway of the steering mechanism is arranged so that a steering burden to a driver is reduced, has spread widely. In such an apparatus, the actuator is driven on the basis of a detected result of an operating physical force applied to the steering wheel for steering, and an operation of the steering mechanism according to the rotation of the steering wheel is assisted by a generated force of the actuator.

However, in such a conventional steering apparatus for a vehicle, it is necessary to mechanically connect the steering wheel which is the steering operating means and the steering mechanism, so there arises a problem such that a position inside the vehicle chamber to which the steering wheel is provided is limited to a position where it can be connected with the steering mechanism provided outside the vehicle chamber. Moreover, even if the steering wheel is provided to the position where it can be connected to the steering mechanism, the realization of the connection requires a complicated connecting structure, and thus it prevents lightening of a vehicle and simplification of the assembly steps of the vehicle.

For example, Japanese Utility Model Application Publication No. 2-29017 (1990) discloses a steering apparatus for a vehicle which is a link-less-type power steering apparatus in order to solve the above problem. Such a steering apparatus for a vehicle is arranged so that the steering wheel is separated from the steering mechanism, and similarly to the actuator for assisting steering in the power steering apparatus, an electric motor as the actuator for steering is provided in a midway of the steering mechanism. When the electric motor is controlled by a steering angle control means composed of a microprocessor to be driven based on detected results of an operating direction and operating quantity of the steering wheel, steering is performed according to the operation of the steering wheel.

A reaction force control means having an electric motor is additionally provided to the steering wheel which is not mechanically connected to the steering mechanism. The reaction force control means controls a motor by a reaction force instruction signal outputted by the steering angle control means to drive the motor on the basis of detected results of the vehicle speed and steering angle of the steering wheel. Thereafter, the reaction force, which is increased or decreased according to increase or decrease of the vehicle speed and steering angle and directs to a neutral position, is applied to the steering wheel. As a result, the steering can be performed in the same manner as a general steering apparatus (connection-type steering apparatus) for vehicles in which the steering wheel is mechanically connected to the steering mechanism.

The link-less-type steering apparatus for a vehicle which is arranged as mentioned above is useful not only to achieve the aforementioned object such as an increase in a degree of freedom for providing the steering wheel and the lightening of a vehicle but also to develop an automobile technique in the future such as realization of a new steering operating means such as a lever and pedal instead of the steering wheel, detection of guide signs on roads, and realization of an automatic operating system according to running information such as reception of satellite information.

The reaction force control means monitors an electric current flowing in the electric motor and its time, and when detecting an overload state of the electric motor (for example, the electric current of 25A flows for 20 seconds), the reaction force control means reduces the electric current flowing in the electric motor forcibly to prevent an overheating state, and reduces the reaction force. FIG. 1 is a graph showing an example of a characteristic of a relationship between a reaction force torque and steering angle in an overload protecting time in the ordinate and abscissa. In this case, the reaction force torque which is the same as the normal time is applied until a predetermined steering angle, but when the steering angle exceeds the predetermined angle, the electric current flowing in the electric motor is restricted so that the reaction force torque does not exceed a predetermined value.

However, if the electric current is restricted so that the reaction force torque does not exceed the predetermined value when the steering angle exceeds the predetermined angle in such a manner, a driver feels that the reaction force torque is changed abruptly at the steering angle, and thus the driver may possibly feel incongruous.

BRIEF SUMMARY OF THE INVENTION

The present invention has been devised to solve the above problems. It is an object of the present invention to provide a link-less-type steering apparatus for a vehicle which does not make a driver feel a incongruous steering sense when the reaction control means is prevented from overload.

The steering apparatus for a vehicle of the present invention is characterized in that when an overload state of a motor which applies a reaction force to a steering operating means is detected, a reaction force control means notifies a reaction force instruction means of the overload state, and that when the reaction force instruction means receives the notification of the overload state, it reduces to correct the reaction force instruction signal in a predetermined ratio.

As a result, as shown in FIG. 2 showing a characteristic of a relationship between a reaction force instruction torque and steering angle in an overload protecting time in the ordinate and abscissa, if the reaction force torque is set so as to become smaller in the same ratio as the normal time in all the steering angles, a driver does not feel that the reaction force torque is changed abruptly in the overload protecting time of the reaction force control means, and the driver does not feel incongruous.

The above and further objects and features of the invention will more fully be apparent from the following detailed description with accompanying drawings.

DETAILED DESCRIPTION OF THE INVENTION

The following details embodiment of the present invention on reference to the drawings.

Figure 3:
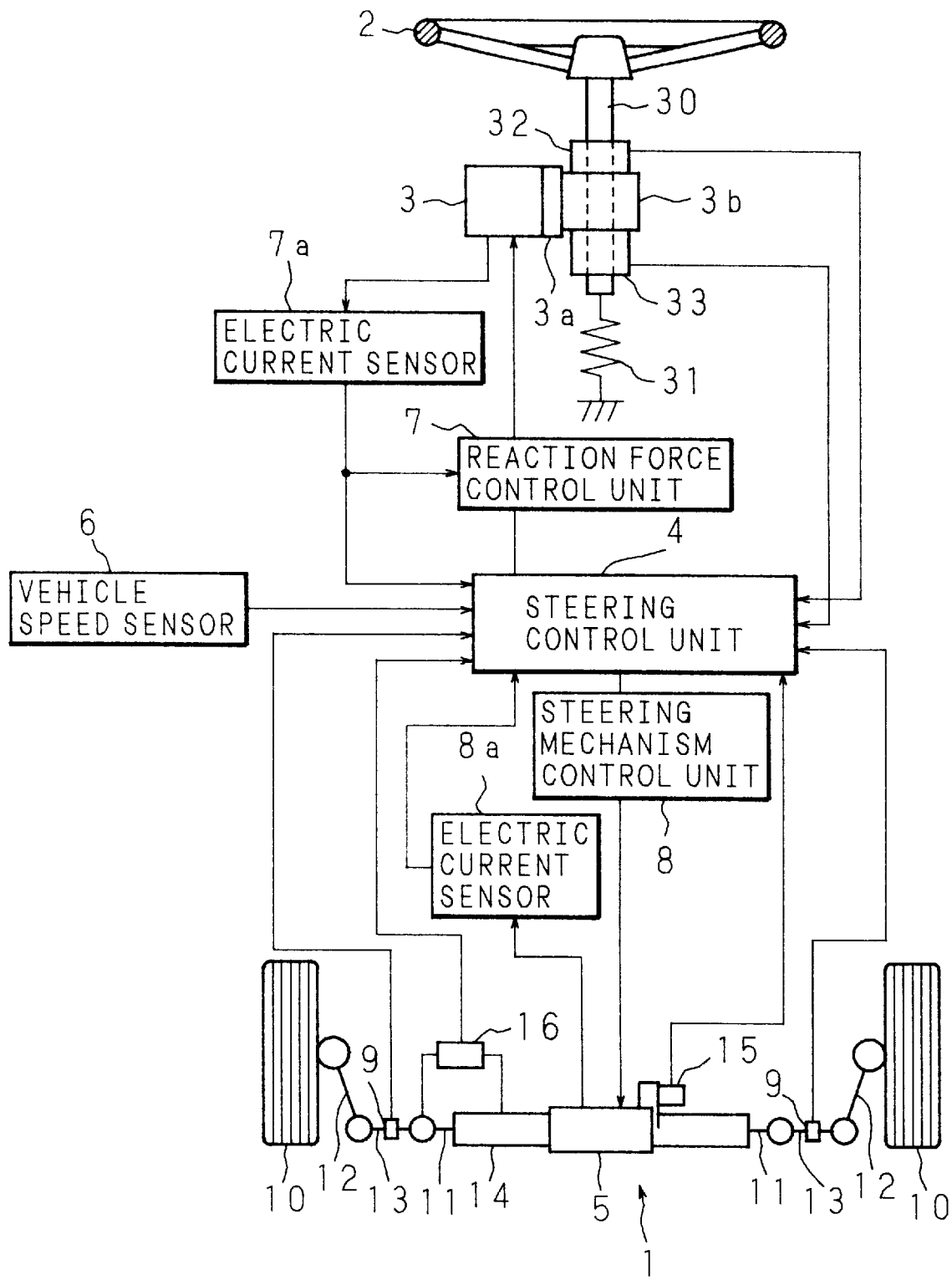
FIG. 3 is a block diagram showing a structure of the steering apparatus for a vehicle of the present invention.

FIG. 3 is a block diagram showing a structure of a steering apparatus for a vehicle of the present invention. The steering apparatus for a vehicle comprises a steering mechanism 1 for steering a pair of wheels 10 for steering provided to the right and left of a car body, not shown, a steering wheel 2 which is a steering operating means provided separately from the steering mechanism 1, an electric motor 3 for applying a reaction force to the steering wheel 2, a reaction force control unit 7 composed of a microprocessor for controlling the electric motor 3 to drive it, a steering mechanism control unit 8 for controlling a steering motor 5 provided to a midway of the steering mechanism 1 to drive it, and a steering control unit 4 composed of a microprocessor which is a steering angle control means and reaction force instruction means. The steering apparatus for a vehicle is made so that the steering motor 5 is driven by an operation of the steering control unit 4 according to an operation of the steering wheel 2, whereby the steering mechanism 1 is operated.

In the steering mechanism 1, as known, both ends of a steering shaft 11 which is extended to the right-and-left direction of the car body and slides to the shaft-length direction are connected to knuckle arms 12 for respectively supporting the wheels 10 by tie rods 13, and the knuckle arms 12 are pushed or pulled by the sliding of the steering shaft 11 to any of the directions via the tie rods 13 so that the wheels 10 are directed to right or left respectively. The wheels 10 are directed by converting the rotation of the steering motor 5, which is arranged in a midway of the steering shaft 11 coaxially, into the sliding of the steering shaft 11 by a suitable motion converting mechanism.

The rotation of steering shaft 11 around its shaft is constrained by a rotation constraint means, not shown, provided between the steering shaft 11 and a steering shaft housing 14, and the rotation of the steering motor 5 is converted into the sliding to the shaft-length direction of the steering shaft 11 so that the steering according to the rotation of the steering motor 5 is performed (turning of the wheels 10 for steering). The electric current flowing in the steering motor 5 is detected by an electric current sensor 8a and is given to the steering control unit 4.

The steering angle of the wheels 10 steered in such a manner is detected by a steering sensor 16 by the medium of a relative sliding position between the steering shaft housing 14 on one side of the steering motor 5 and the steering shaft 11, and an output of the steering sensor 16 is given to the steering control unit 4 together with an output of a rotary encoder 15 for detecting the rotary position of the steering motor 5.

Axial force sensors 9 for detecting an axial force applied to the wheels 10 by a road surface reaction force from the surface of a road are provided to the tie rods 13, and outputs of the axial force sensors 9 are given to the steering control unit 4.

The electric motor 3 for applying a reaction force to the steering wheel 2 is fixed to a casing of a rotary shaft 30, and its rotary motion is transmitted to the rotary shaft 30 via an electromagnetic clutch 3a, and after its rotary direction is converted by a worm gearing mechanism 3b.

The steering wheel 2 is fixed to one projected end of the rotary shaft 30 coaxially, and the other projected end is connected to a suitable portion of the car body by a torsion spring 31 having predetermined elasticity.

The electric motor 3 is driven to both of contrary directions by applying electricity from the reaction force control unit 7 according to the reaction force instruction signal given from the steering control unit 4, so that a force (reaction force) whose direction is opposite to the operating direction of the steering wheel 2 is given to the steering wheel 2 provided to one end of the rotary shaft 30. Therefore, it is necessary to apply a steering torque, which opposes the reaction force generated by the electric motor 3, to the rotary operation of the steering wheel 2, and the steering torque applied to the steering wheel 2 is detected by a torque sensor 32. An output of the torque sensor 32 is given to the steering control unit 4.

The operating quantity (steering angle) including the operating direction of the steering wheel 2 is detected by a rotary encoder 33 which is a steering angle detecting means. This detected result is given to the steering control unit 4.

In addition, the electric current flowing in the electric motor 3 is detected by an electric current sensor 7a and is given to the steering control unit 4 and reaction force control unit 7.

Here, the torsion spring 31, which is installed between the other end of the rotary shaft 30 and one portion of the car body, rotates the rotary shaft 30 with its elasticity when the rotary operation which is performed in the above manner is stopped so as to return the steering wheel 2 to a predetermined neutral position. The returning is necessary in for returning the steering wheel 2 according to the returning operation of the wheels 10 to a straight-advancing direction on the side of the steering mechanism 1 separated mechanically.

As mentioned above, the steering state which occurs actually on the side of the steering mechanism 1 is given to the steering control unit 4 as inputs from the rotary encoder 15 and steering sensor 16, and the operating state of the steering wheel 2 as the steering operating means is given to the steering control unit 4 as inputs from the torque sensor 32 and rotary encoder 33. Moreover, an output of a vehicle speed sensor 6 for detecting a running speed of the vehicle and a notice signal which notifies the overload state from the reaction force control unit 7 are given to the steering control unit 4.

Meanwhile, as mentioned above, the output of the steering control unit 4 is given to the reaction force control unit 7 for applying a reaction force to the steering wheel 2, and the steering mechanism control unit 8 for controlling the steering mechanism 1. The reaction control unit 7 and steering mechanism control unit 8 perform respective control operations according to the instruction signals from the steering control unit 4.

The steering control unit 4 increases or decreases the reaction force to be applied to the steering wheel 2 according to high or low vehicle speed which is given as the input from the vehicle speed sensor 6, for example, and gives a reaction force instruction signal for generating the reaction force to the reaction force control unit 7, thereby controlling the reaction force.

In addition, the steering control unit 4 recognizes the operating angle including the operating direction of the steering wheel 2 through the input from the rotary encoder 33, and obtains a steering angle deviation from an actual steering angle recognized by the input from the steering sensor 16 provided to the steering mechanism 1, and corrects the steering angle deviation so that the deviation is increased or decreased according to the vehicle speed given as the input of the vehicle speed sensor 6 and obtains a target steering angle. The steering control unit 4 performs the steering control operation for driving the steering motor 5 until the target steering angle is obtained. At this time, the input from the rotary encoder 15 is used as a feedback signal for checking as to whether or not the steering motor 5 reaches a desired rotary position.

The following describes an operation of the steering apparatus for a vehicle of the present invention having the above configuration with reference to flow charts.

Figure 4:
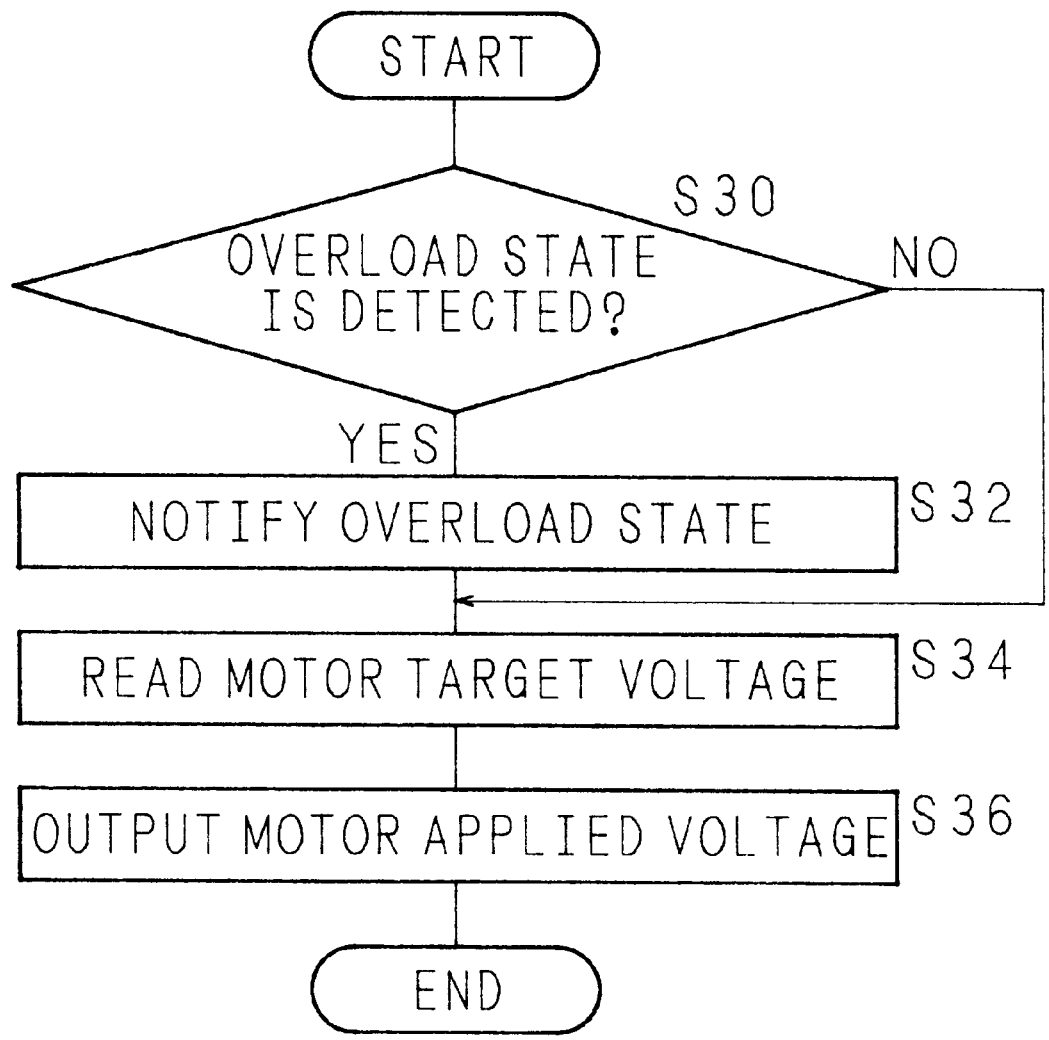
FIG. 4 is a flow chart for explaining an operation of a reaction force control unit in FIG. 3.

FIG. 4 is a flow chart for explaining an operation of the reaction force control unit 7 in FIG. 3. The reaction force control unit 7 observes the current flowing in the electric motor 3 and its flowing time, and when it detects an overload state (for example, the electric current of 25A flows for 20 seconds) (S30), it notifies the steering control unit 4 of the overload state (S32).

Next, the reaction force control unit 7 reads a value of a motor target voltage (reaction force instruction signal) from the steering control unit 4 (S34) to output the value as a motor applied voltage into the electric motor 3 (S36), and the sequence goes to the next control.

When the reaction force control unit 7 does not detect the overload state (S30), it does not notify (S32) of the overload state, so reads a value of the motor target voltage (reaction force instruction signal) from the steering control unit 4 (S34) to output the value as the motor applied voltage into the electric motor 3 (S36), and the sequence goes to the next control.

Figure 5:
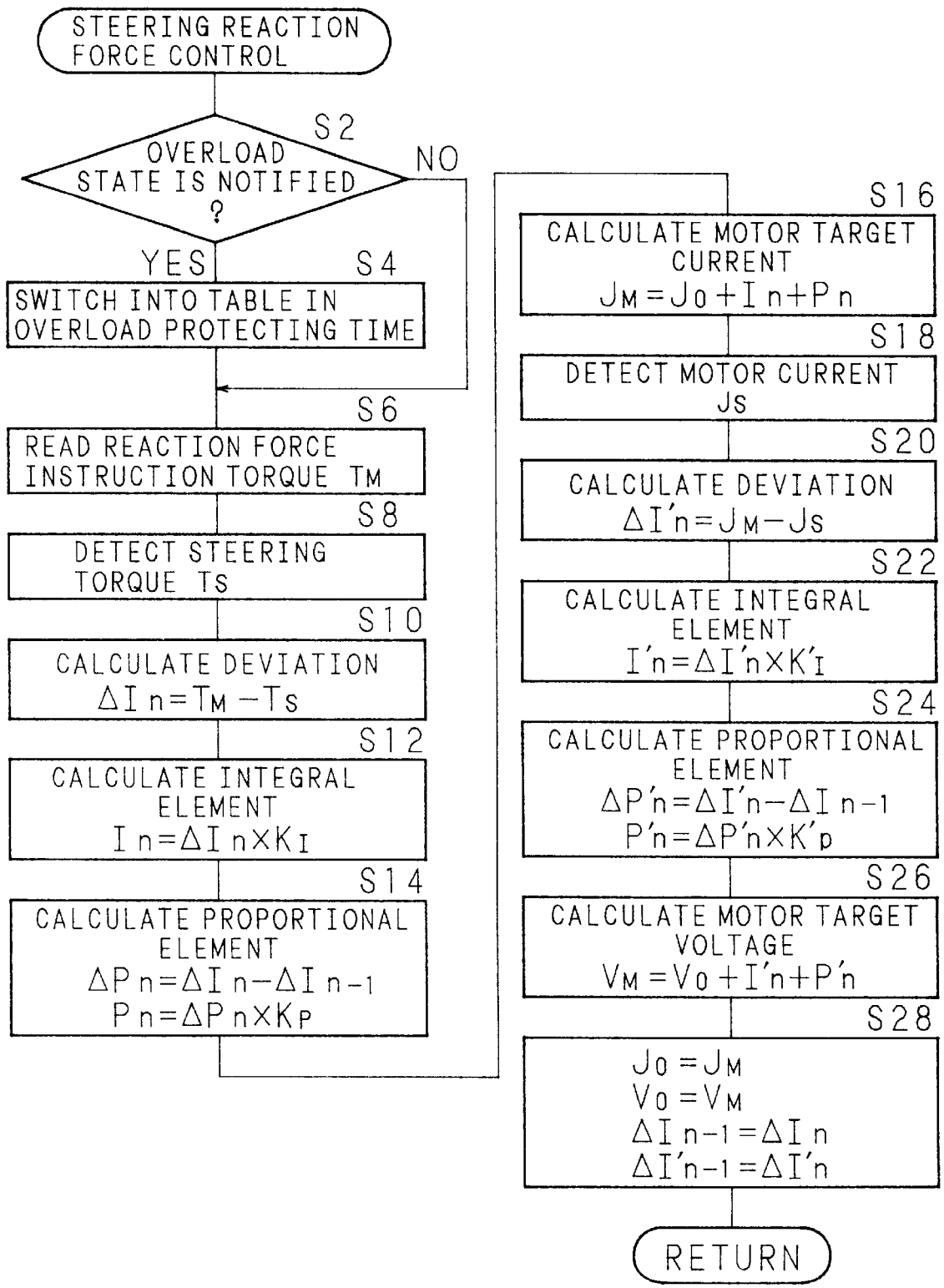
FIG. 5 is a flow chart for explaining an operation of a steering control unit in FIG. 3.

FIG. 5 is a flow chart for explaining an operation of the steering control unit 4 in FIG. 3. When receiving the notification of the overload state from the reaction force control unit 7 (S2), the steering control unit 4 switches from a table in which a relationship between the reaction force instruction torque and the steering angle in the normal time is stored into a table in which the relationship between the reaction force instruction torque and the steering angle in the overload protecting time is stored (S4), and reads a reaction force instruction torque $T_M$ according to the steering angle detected by the rotary encoder 33 from the table in the overload protecting time (S6).

Figure 1:
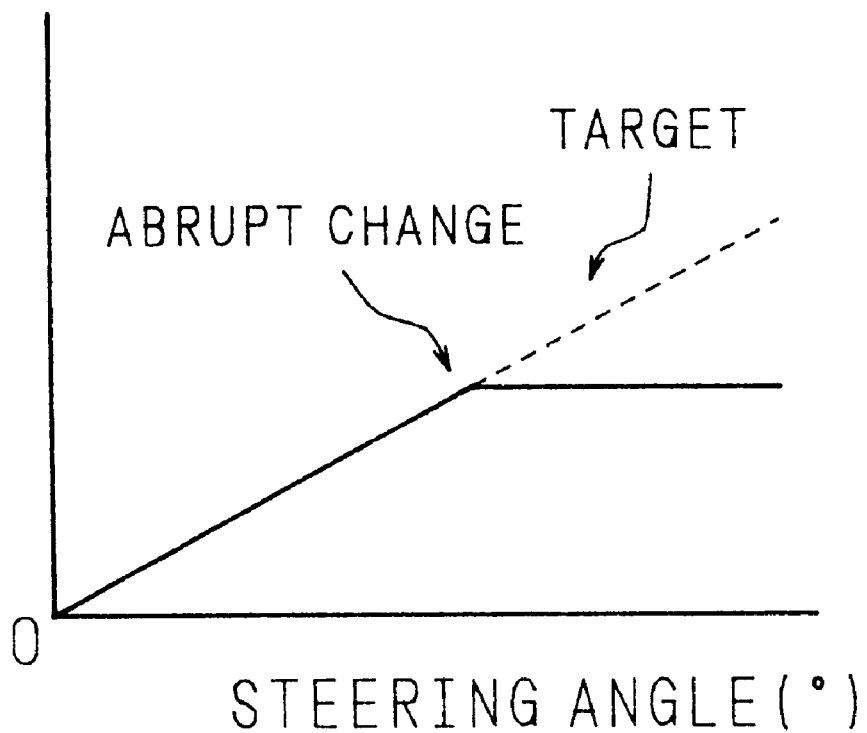
FIG. 1 is an explanatory drawing for explaining a conventional characteristic of a relationship between reaction force torque and steering angle in an overload protecting time.
Figure 2:
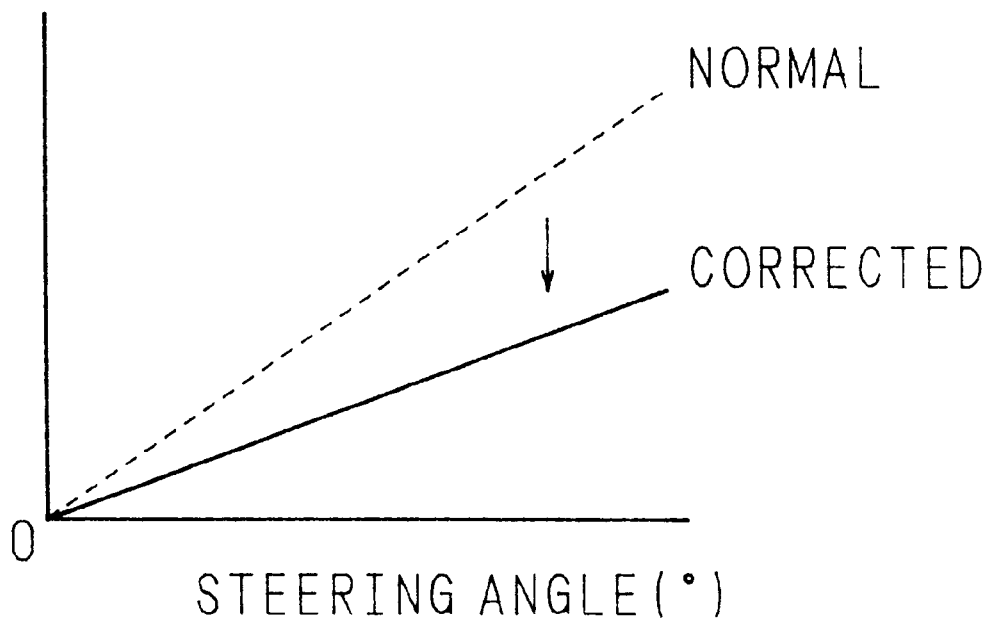
FIG. 2 is an explanatory drawing for explaining a table storing the characteristic of the relationship between reaction force instruction torque and steering angle when overload is prevented in a steering apparatus for a vehicle of the present invention is prevented.

In the table in which the characteristic of the relationship between the reaction force instruction torque and the steering angle in the overload protecting time is stored, as shown in FIG. 2, for example, the reaction force instruction torque is reduced in the constant ratio to that of the normal time with respect to all the steering angles. Here, the characteristic of the relationship between the reaction force instruction torque and the steering angle may be obtained by calculation.

When the steering control unit 4 does not receive the notification of the overload state from the reaction control unit 7 (S2), it reads the reaction force instruction torque $T_M$ from the table in which the relationship between the reaction force instruction torque and the steering angle in the normal time is stored (S6).

Next, the steering control unit 4 obtains a steering torque $T_S$ detected by the torque sensor 32 (S8), and calculates a torque deviation $\Delta I_n = T_M - T_S$ between the reaction force instruction torque $T_M$ and steering torque $T_S$ (S10) and calculates an integral element of the reaction force control $I_n = \Delta I_n \times K_I$ ($K_I$: predetermined integral constant) (S12).

Next, the steering control unit 4 calculates a proportional element $P_n = (\Delta I_n - \Delta I_{n-1}) \times K_P$ ($\Delta I_{n-1}$: torque deviation in previous period, $K_P$: predetermined proportional constant) (S14), and calculates a target electric current of the electric motor 3 (reaction force motor target electric current) $J_M = J_O + I_n + P_n$ ($J_O$: target electric current in previous period) (S16).

Next, the electric current $J_S$ of the electric motor 3 is detected by the electric current sensor 7a (S18), the steering control unit 4 calculates an electric current deviation $\Delta I_n' = J_M - J_S$ between the target electric current $J_M$ and actual electric current $J_S$ of the electric motor 3 (S20).

Next, the steering control unit 4 calculates an integral element of the reaction force control $I_n' = \Delta I_n' \times K_I'$ ($K_I'$: predetermined integral constant) (S22), and calculates a proportional element $P_n' = (\Delta I_n' - \Delta I_{n-1}') \times K_P'$ ($\Delta I_{n-1}'$: electric current deviation in previous period, $K_P'$: predetermined proportional constant) (S24).

Next, the steering control unit 4 calculates a target voltage $V_M = V_O + I_n' + P_n'$ ($V_O$: target voltage in previous period) of the electric motor 3 (S26), and controls the reaction force control unit 7 to output the motor target voltage $V_M$ so as to drive the electric motor 3.

Next, the steering control unit 4 respectively translates the target electric current $J_M$ to the target electric current $J_O$ in previous period, the target voltage $V_M$ to the target voltage $V_O$ in previous period, the torque deviation $\Delta I_n$ to the torque deviation $\Delta I_{n-1}$ in previous period, and the electric current deviation $\Delta I_n'$ to the electric current deviation $\Delta I_{n-1}'$ in previous period (S28), and the sequence goes to the next control.

Here, the above embodiment shows one example of the steering apparatus for a vehicle of the present invention, so the reaction force actuator is not limited to the electric motor 3 and steering motor 5. Moreover, needless to say, as the steering operating means, instead of the steering wheel 2, another operating means such as a lever, joy stick or the like can be used.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

We claim:

1. A steering apparatus for a vehicle, comprising:
   a steering operating means which is not mechanically connected to a steering mechanism for changing a direction of wheels;
   a steering angle detecting means for detecting a steering angle of said steering operating means;
   a steering angle control means for controlling an increase and decrease in a steering angle of said steering mechanism according to the steering angle detected by said steering angle detecting means;
   a reaction force instruction means for obtaining a reaction force which is to be applied to said steering operating means and directs it to a neutral position on the basis of the steering angle so as to output a reaction force instruction signal for instructing that the obtained reaction force is applied to said steering operating means;

a reaction force control means for controlling an increase and decrease in the reaction force to be applied to said steering operating means on the basis of the reaction force instruction signal;

a motor for applying the reaction force to said steering operating means under control of said reaction force control means;

means for detecting an overload state of said motor; and means for notifying said reaction force instruction mean of the overload state when the overload state is detected, said reaction force instruction means varying the reaction force instruction signal so as to decrease the reaction force applied by said motor by a predetermined proportion when receiving the notification of the overload state.

2. A steering apparatus for the vehicle according to claim 1, further comprising:

a steering mechanism control unit which is controlled by said steering angle control means; and a steering mechanism for changing the direction of said wheels, the steering mechanism being controlled by said steering mechanism control unit, and including:
a steering shaft which extends in the right-and-left direction of the vehicle body and which slides along its length;
knuckle arms for supporting said wheels respectively;
tie rods for connecting the ends of said steering shaft and said knuckle arms respectively;
a steering motor which is provided approximately midway of said steering shaft coaxially and which is driven by said steering mechanism control unit; and
a motion converting mechanism for converting the rotation of said steering motor into sliding of said steering shaft.

3. A steering apparatus for the vehicle according to claim 1, wherein said reaction force instruction means has a table in which is stored a relationship between reaction force instruction torque and steering angle during normal motor operation and a table in which is stored a relationship between reaction force instruction torque and steering angle during motor overload protection operation, and the reaction force instruction means corrects said reaction force instruction signal during motor overload protection operation using the latter table.

4. A steering apparatus for the vehicle according to claim 1, wherein said reaction force instruction means has a table in which is stored a relationship between reaction force instruction torque and steering angle during normal motor operating, and corrects said reaction force instruction signal during motor overload using a value corrected by modifying a value in the table in a predetermined manner.

5. A steering apparatus for a vehicle including a steering operating device, controlled by an operator which is not mechanically connected to a steering mechanism which changes direction of vehicle wheels, comprising:

a steering angle detector detecting the orientation of the steering operating device;

a steering angle controller controlling said steering mechanism according to the orientation detected by said steering angle detector;

a reaction force controller producing a reaction force signal related to a desired reaction force which is to be applied to said steering operating device so as to direct it to a neutral position on the basis of the steering angle;

a motor controlled by the reaction force signal and coupled to apply the reaction force to the steering operating device;

a motor overload state detector producing an overload signal indicating motor overload; and said reaction force controller responding to said overload signal by adjusting the reaction force signal so as to reduce the reaction force applied by said motor by a predetermined proportion.

6. A steering apparatus for a vehicle according to claim 5, further comprising:

a steering shaft which extends laterally of the vehicle body and which moves along its length;

knuckle arms for supporting said wheels;

tie rods for connecting either end of said steering shaft with said knuckle arms;

a steering motor which is provided substantially midway of said steering shaft and which is controlled by said steering angle controller; and a motion converting mechanism for converting the rotation of said steering motor into a translational motion of said steering shaft.

7. A steering apparatus for a vehicle according to claim 5, wherein said reaction force controller contains a table storing the relationship between reaction force instruction torque and steering angle during normal motor operation, and a table storing the relationship between reaction force instruction torque and steering angle during motor overload protection operation, said reaction force controller adjusting the reaction force signal during a time when the motor operates in overload protection, using the latter table.

8. A steering apparatus for the vehicle according to claim 5, wherein said reaction force controller contains a table storing the relationship between reaction force instruction torque and steering angle during normal motor operation, the controller correcting said reaction force signal during motor overload protection operation by modifying a value in the table in a predetermined manner.

* * * * *